United States Patent [19]
Darley

[11] Patent Number: 4,979,140
[45] Date of Patent: * Dec. 18, 1990

[54] SIGNED DIGIT ADDER CIRCUIT

[75] Inventor: Henry M. Darley, Plano, Tex.

[73] Assignee: Texas Instruments Incorporated, Dallas, Tex.

[*] Notice: The portion of the term of this patent subsequent to Dec. 26, 2006 has been disclaimed.

[21] Appl. No.: 386,825

[22] Filed: Jul. 27, 1989

Related U.S. Application Data

[63] Continuation of Ser. No. 175,967, Mar. 31, 1988, Pat. No. 4,890,127.

[51] Int. Cl.$^5$ .............................................. G06F 7/50
[52] U.S. Cl. ..................................................... 364/786
[58] Field of Search ........................ 364/768, 784, 786

[56] References Cited

U.S. PATENT DOCUMENTS 3,462,589 8/1969 Robertson ........................... 364/786

OTHER PUBLICATIONS

Metropolis et al., "Significant Digit Computer Arithmetic", IRE Trans. on Electronic Computer, Dec. 1958, pp. 266–267.
Auizienis, "Signed-Digit Number Representations for Fast Parallel Arithmetic", IRE Trans. on Electronic Computer, Sep. 1969, pp. 389–400.
Avizienis, "Binary-Compatible Signed-Digit Arithmetic", Proc. Fall Joint Computer Conference, 1964, pp. 663–672.
Atkins, "Design of the Arithmetic Unit of ILLIAC III: Use of Redundancy and Higher Radix Method", IEEE Trans. on Computer, C-19, No. 8, Aug. 1970, pp. 720–733.
Harata et al., "High Speed Multiplier Using a Redundant Binary Adder Tree", in Proc. IEEE ICCD'84, Oct. 1984, pp. 165–170.
Tung, "Division Algorithm for Signed-Digit Arithmetic", IEEE Trans. on Computers, Sep. 1968, pp. 887–889.

Primary Examiner—Gary V. Harkcom
Assistant Examiner—Tan V. Mai
Attorney, Agent, or Firm—B. Peter Barndt; James T. Comfort; Melvin Sharp

[57] ABSTRACT

A signed digit adder (10) includes a plurality of cells (12) which input signals $X_s$, $X_m$, $Y_s$, $Y_m$, $R_{-1}$ and $U_{-1}$, where $X_s$ and $X_m$ are the sign and magnitude bits of one digit of a signed bit representation. Similarly, $Y_s$ and $Y_m$ are the sign and magnitude bits of the second operand. $R_{-1}$ and $U_{-1}$ are signals received from the preceding cell (12). Each cell outputs R and U bits, and the sum bits $Z_s$ and $Z_m$. Each cell (12) comprises function blocks (14–26) which determine the outputs from the given inputs. Function block (14) determines the output R as NOT $(X_s+Y_s)$. Function block (20) determines the output U=E.NOT $(R_{-1})$+NOT (E) . NOT (Q) where Q=(NOT $(X_s)$)+NOT $(Y_s).X_m$. The determination of Q is performed in function block (16). Function block (24) determines the output $Z_s=U_{-1}.T$ and function block (26) determines the output Zm=$U_{-1}$ XOR(-NOT(T)). T is determined in function block (22)=E XOR (NOT $(R_{-1})$). E is determined in function block (18) as $X_m$ XOR $Y_m$. Function blocks (14–26) are optimized for speed relative to the temporal validity of the inputs.

8 Claims, 2 Drawing Sheets

SIGNED DIGIT ADDER CIRCUIT

This is a continuation of application Ser. No. 175,967, filed Mar. 31, 1988, now U.S. Pat. No. 4,890,127.

TECHNICAL FIELD OF THE INVENTION

This invention pertains in general to integrated circuits, and more particularly to a signed digit adder circuit.

BACKGROUND OF THE INVENTION

High speed computation is the critical design factor in many systems, such as computers, signal processors, and process controllers. These systems increasingly rely on LSI integrated circuits to perform the multiplicative function on a single chip. Multiplication using signed digit redundant number representation allows the addition of partial products in the binary tree at speeds faster than the Booth-Wallace approach, and at the same time, has an iterative structure that increases circuit density and ease of layout. The signed digit redundant number representation permits high speed binary addition trees, because it is possible to perform carry-free addition therewith.

In order to take advantage of the binary tree, a circuit cell is needed that will sum two signed digits. Such circuits have been described for ECL technology in N. Takagi, H. Yashuura, S. Yajima, *High Speed VLSI Multiplication Algorithm with a Redundant Binary Addition Tree*, IEEE Transactions on Computers, Vol. C-34, No.9, September, 1985. The structure described therein is designed for ECL circuitry using NOR/OR logic, which is inapplicable to other technologies, such as CMOS. Further, the circuit described therein does not minimize the number of gate delays and transistors and maximize speed in performing the logical addition of two signed digits.

Therefore, a need has arisen in the industry for a signed digit adder circuit which minimizes gate delays and the number of transistors used to implement a signed digit adder circuit.

SUMMARY OF THE INVENTION

In accordance with the present invention, a signed digit adder circuit is provided which substantially eliminates or reduces the disadvantages and problems associated with prior adding circuits.

The adding circuit of the present invention adds two signed digit addends, X and Y, each digit of the addends represented respectively by signed portions, $X_s$ and $Y_s$, and magnitude portions, $X_m$ and $Y_m$. The adding circuit comprises a plurality of successively interconnecting cells, each cell having inputs for respective digits of the addends, and for receiving outputs from the preceding cell. Each cell comprises circuitry for generating a first logical output, R, which is determined by the signed portions, $X_s$ and $Y_s$. The value R determined by one cell is transmitted to the successive cell. The adding circuit further comprises circuitry for generating first intermediate values Q and E, based on the signs and magnitudes of the addends. A second intermediate logical value T is determined by the intermediate value E and by the first logical output R of the preceding cell. The circuitry for calculating T is optimized such that T is calculated rapidly with respect to E, thus improving the speed of the circuit. A second logical output, U, is determined by Q and the value R input from the preceding cell. The circuitry for determining U is optimized such that U is calculated rapidly after the value Q becomes valid. The output sum digits are calculated based on the value U from the previous cell and on the value T.

The present invention provides several technical advantages. First, the number of transistors used in each cell is minimized, thereby reducing the size of the adding circuit, which may be used in conjunction with a multiplier circuit. Further, the present invention increases the speed of the calculation by the optimizing each subcircuit to output valid data as quickly as possible after inputs to that subcircuit are valid.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE DRAWINGS

Figure 1:
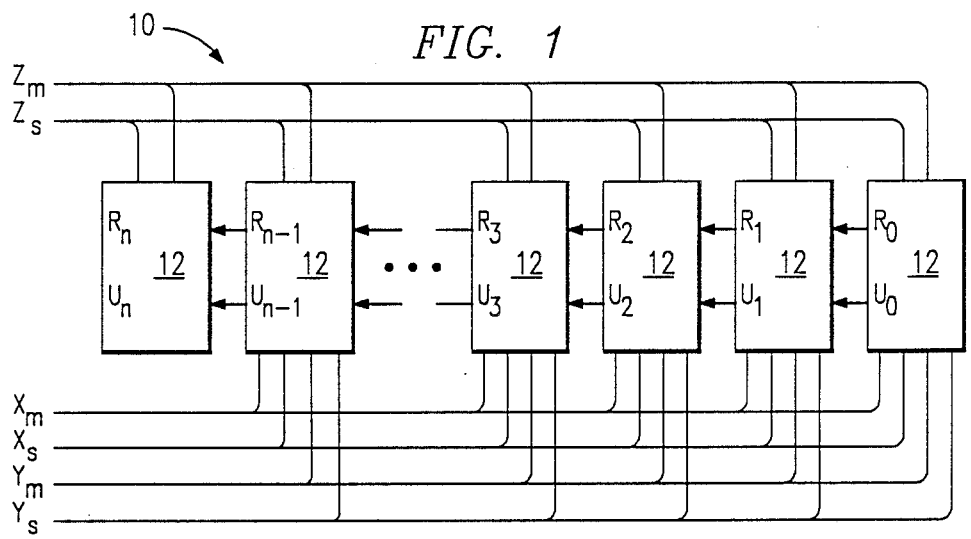
FIG. 1 illustrates a block diagram of n-bit signed digit adder.
Figure 2:
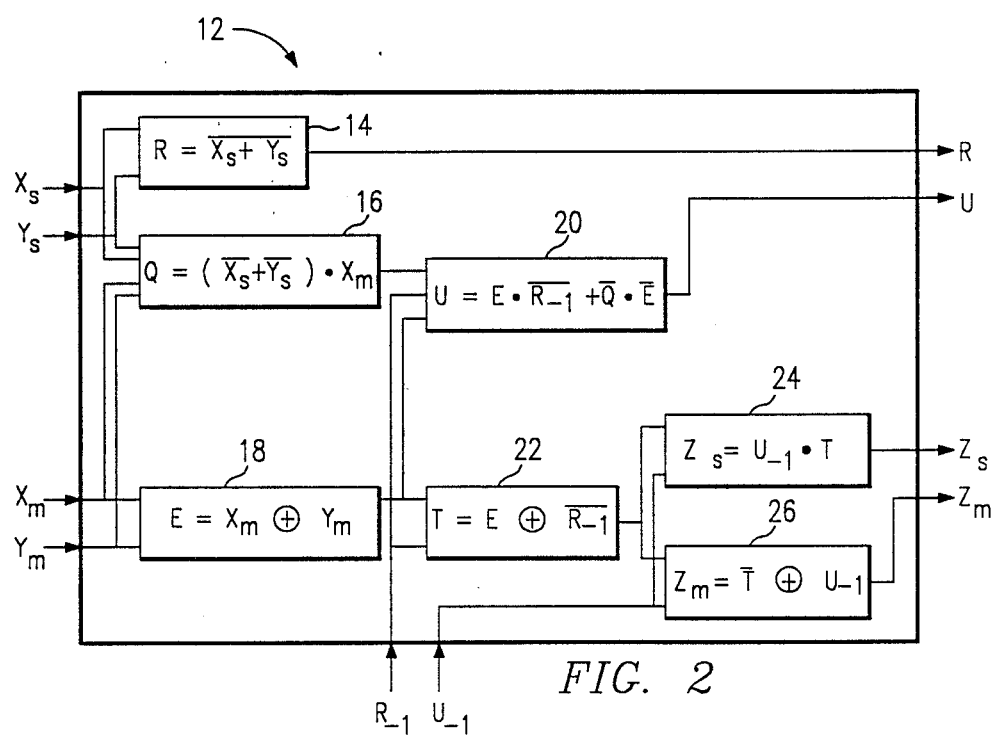
FIG. 2 illustrates a functional block diagram of one cell of the signed digit adder of FIG. 1.
Figure 3:
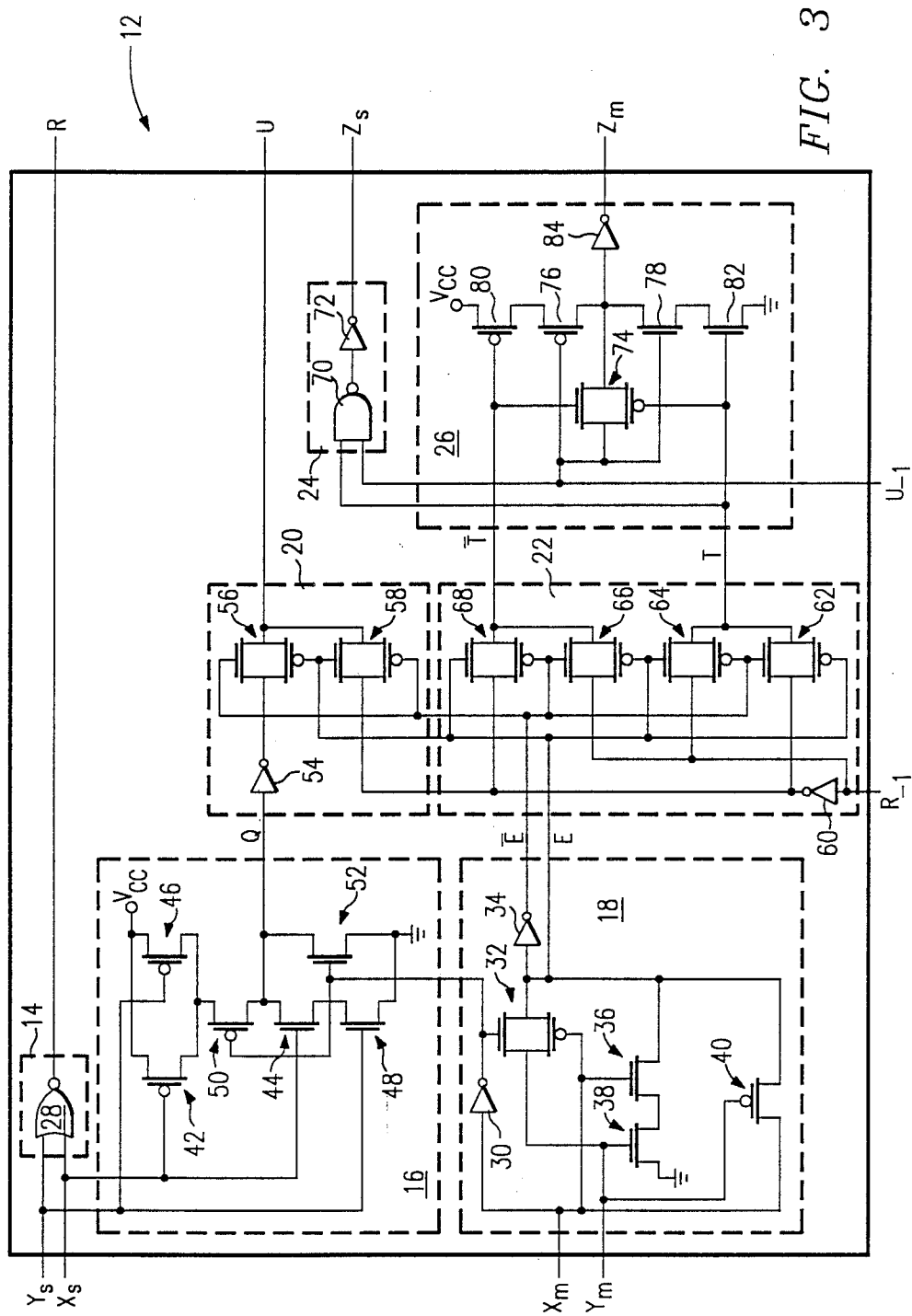
FIG. 3 illustrates a circuit diagram of the cell illustrated in FIG. 2.

The preferred embodiment of the present invention is best understood by referring to FIGS. 1-3 of the drawings, like numerals used for like and corresponding parts of the various drawings.

FIG. 1 illustrates a block diagram of an n-bit signed digit adder 10. The signed digit adder 10 has n cells 12, one for each digit of the adder plus an additional overflow cell 13. Each cell 12 has four data inputs: $X_m$, $X_s$, $Y_m$ and $Y_s$. Each input comprises n digits (for example, $X_{m(n-1)} \ldots X_{m(0)}$. In signed digit representation, each digit of the number comprises a sign bit and a magnitude bit, such that each digit may represent a 0, 1 or −1. In the illustrated embodiment, a 0 is denoted by $X_s=0$ and $X_m=0$, a 1 is denoted by $X_s=0$ and $X_m=1$, and a −1 is denoted by $X_s=1$ and $X_m=1$. $X_s$ and $X_m$ comprise the digits for the first addend and $Y_s$ and $Y_m$ comprise the digits for the second addend.

Each cell outputs a respective digit of the output sum Z, where $Z_s$ represents the sign bit and $Z_m$ represents the magnitude bit for each digit. Also, each cell 12 outputs two intermediate values R and U and inputs the outputs R and U of the preceding cell (hereinagter $R_{-1}$ and $U_{-1}$). As will be described in FIG. 2, R is a function of the sign bits $X_s$ and $Y_s$, and U is a function of the sign and magnitude bits and $R_{-1}$. Hence, the output of each cell depends only upon data propagted from the two previous cells, as opposed to conventional magnitude adders in which the carry bit may propagate through all n cells.

FIG. 2 illustrates a block diagram showing the functional implementation of the cells 12 of FIG. 1. Each cell 12 inputs respective sign bits $X_s$ and $Y_s$ and magnitude bits $X_m$ and $Y_m$ corresponding to its position in the adder. Also, each cell 12 inputs the R and U values from the preceding cell, denoted as $R_{-1}$ and $U_{-1}$. Each cell outputs R and U values to the next cell, and outputs sign and magnitude sum bits $Z_s$ and $Z_m$.

In function block 14, the R value is calculated as NOT $(X_s+Y_s)$. For purposes of this specification, "NOT" is used to denote the logical inverse of a bit, "+" is used to denote a logical "OR" function, "XOR" is used to denote a logical exclusive OR function, and "AB" or A•B is used to denote the logical AND function of operands A and B. Function block 16 determines an intermediate value Q=(NOT($X_s$)) and (NOT($Y_s$))•$X_m$. The intermediate value Q is used in calculating the value U for the cell. Function block 18 calculates an intermediate value E=$x_m$ XOR $Y_m$. Function blocks 14, 16 and 18 are connected to the operand values $X_m$, $X_s$, $Y_m$, and $Y_s$.

Function block 20 is connected to the outputs of function blocks 16 and 18, and to the $R_{-1}$ input. Function block 20 determines the value U=E•(NOT($R_{-1}$))+NOT(Q)•(NOT(E)), where Q and E are determined by function blocks 16 and 18. Function block 22 is connected to function block 18 and to input $R_{-1}$. The function block 22 determines an intermediate value T=E XOR (NOT($R_{-1}$)).

Function blocks 24 and 26 determine the outputs $Z_s$ and $Z_m$ for the cell 12. The function blocks 24 and 26 are connected to function block 22 and to the input $U_{-1}$. Function block 24 determines $Z_s$=$U_{-1}$T. Function block 26 determines $Z_m$=(NOT(T)) XOR $U_{-1}$.

FIG. 3 illustrates the preferred implementation of the function blocks 14–26. Functional block 14 is connected to inputs $X_s$ and $Y_s$ and comprises a NOR gate 28 having $X_s$ and $Y_s$ as inputs. The output of NOR gate 28 is connected to the R output of the cell 12.

Function block 18 performs the calculation E=$X_m$XOR $Y_m$. An inverter 30 is connected to the $X_m$ input and has an output connected to the control gate of a transmission gate 32. For purposes of this specification, a transmission gate comprises a N-channel and P-channel transistor having connected sources and drains, such that a logical one (logical high voltage) or logical zero (logical low voltage) is passed from input to output when a logical low voltage is connected to the P-channel gate (the "complement control gate") and a high signal is present on the N-channel gate (the "control gate"). When a logical high is on the P-channel gate and logical low is on the N-channel, no logical value is passed to the output. If both control gates are high or low, a "weak" logical value is passed. In the illustrated circuit, this condition is avoided to the extent possible.

The input of the transmission gate 32 is connected to the input $Y_m$ and the output of the transmission gate 32 is connected to an inverter 34. The complement control gate of the transmission gate 32 is connected to the input $X_m$. The input of the inverter 34 is also connected to the drain of N-channel transistor 36. The gate of N-channel transistor 36 is connected to the input $X_m$ and the source of the N-channel transistor 36 is connected to the drain of Nchannel transistor 38. The gate of N-channel transistor 38 is connected to the input $Y_m$ and the source of N-channel transistor 38 is connected to ground. The input to inverter 34 is connected to the drain of P-channel transistor 40, having its gate connected to the input $Y_m$ and its source connected to the input $X_m$. The input to inverter 34 has the value of E and the output of inverter 34 has the value of NOT(E).

Functional block 16 implements the function Q=(NOT ($X_s$)+NOT($Y_s$)•$X_m$. The $X_s$ input is connected to the gate of a P-channel transistor 42 and the gate of an N-channel 44. The input $Y_s$ is connected to the gate of a P-channel transistor 46 and the gate of an N-channel transistor 48. The output of inverter 30 of functional block 18 is connected to the gate of a P-channel transistor 50 and the gate of a N-channel transistor 52. The sources of P-channel transistors 42 and 46 are connected to $V_{cc}$. The source of P-channel transistor 50 is connected to the drains of P-channel transistors 42 and 46. The sources of N-channels transistors 48 and 52 are connected to ground. The source of N-channel transistor 44 is connected to the drain of N-channel transistor 48. The drains of N-channel transistors 44 and 52 and the drain of P-channel transistor 40 are connected to the input of an inverter 54 in block 20.

Functional block 20 implements the function U=E•NOT($R_{-1}$)+NOT(E)•NOT(Q), where E and Q are determined in blocks 18 and 16, respectively, and $R_{-1}$ is input from the preceding cell 12. Functional block 20 comprises two transmission gates 56 and 58. The output of inverter 34 of function block 18 is connected to the control gate of transmission gate 56 and to the complement control gate of transmission gate 58. The input to inverter 34 is connected to the complement control gate of transmission gate 56 and to the control gate of transmission gate 58. Transmission gate 56 receives its input from the output of inverter 54 and transmission gate 58 receives its input from the output of inverter 60 (see function block 22) which is connected to the $R_{-1}$ input. The outputs of the transmission gates 56 and 58 are connected to the output U.

Function block 22 implements the function T=E XOR NOT($R_{-1}$) where E is determined in function block 18 and $R_{-1}$ is input from the preceding cell 12. The function block 22 comprises the inverter 60 and four transmission gates 62, 64, 66 and 68. Inverter 60 has its input connected to $R_{-1}$ and its output connected to the inputs of transmission gates 62 and 68. The input $R_{-1}$ is connected to the inputs of transmission gates 64 and 66. The output of inverter 34 is connected to the complement control gates of transmissions gates 68 and 64, and to the control gates of transmissions gates 66 and 62. The input to inverter 34 is connected to the complement control gates of transmission gates 66 and 62, and to the control gates of transmission gates 64 and 68. The outputs of transmission gates 66 and 68 are connected together to form the inverted T output, and the outputs of transmission gates 62 and 64 are connected together to determine the T output.

Function block 24 implements the function $Z_s$=$U_{-1}$•T, where T is determined by function block 22. Function block 24 comprises a NAND gate 70 having inputs connected to the T output of function block 22 and to the $U_{-1}$ input. The output of the NAND gate 70 is connected to an inverter 72, whose output is connected to the $Z_s$ output.

Function block 26 implements the function $Z_m$=NOT(T) XOR $U_{-1}$. A transmission gate 74 has its input connected to the $U_{-1}$ input, its control gate connected to the inverted T output of the function block 22 and its complement control gate connected to the T signal from the function block 22. The output of transmission gate 74 is connected to the drains of P-channel transistor 76 and N-channel transistor 78. The gates of transistors 76 and 78 are connected to the input $U_{-1}$. The source of P-channel transistor 76 is connected to the drain of a P-channel transistor 80, which has its gate connected to the inverted T signal from function block 22 and its source connected to $V_{cc}$. The source of N-channel transistor 78 is connected to the drain of N-channel transistor 82, which has its gate connected to the T signal from function block 22 and its source connected to ground. The node connecting the output of transmission gate 74 and the drains of transistors 76 and 78 is connected to the input of inverter 84. The output of inverter 84 is connected the $Z_m$ output.

The function blocks 14–26 are optimized for speed relative to the availability of the inputs. For example, in function block 22, it can be assumed that the input $R_{-1}$ will be valid before the determination of E, since the determination of $R_{-1}$ can be made by propagation through a single NOR gate once $X_s$ and $Y_s$ are valid. Therefore, function block 22 is optimized such that the XOR function is fast with respect to E, i.e., the delay from $E_{valid}$ $T_{valid}$ is minimized. In function block 20, it is assumed that Q and E become valid at about the same time; therefore, neither is given preference. Similarly, in function block 16 and 18, neither $X_s$, $Y_s$, $X_m$ or $Y_m$ is given preference, since it cannot be determined which will become valid first.

Function blocks 24 and 26 are designed to provide sufficient drive for the load capacitance of the output $Z_x$ and $Z_m$. The inverters 72 and 84 supply the necessary gain to drive the outputs.

The adder of the present invention provides the technical advantage of high speed performance in a circuit suitable for CMOS implementation. The above-described circuit is capable of a 2.5 nanosecond add. Furthermore, the number of transistors to implement the circuit is minimized, thereby reducing the cell size.

Although the present invention has been described in detail, it should be understood that various changes, substitutions and alterations can be made herein without departing from the spirit and scope of the invention as defined by the appended claims.

What is claimed is:

1. High-speed numerical processor having a plurality of cells for adding two signed digit addends, X and Y, each addend having a plurality of digits, each digit representable by logical sign portions, $X_s$ and $Y_s$, and logical magnitude portions, $X_m$ and $Y_m$, each said cell comprising:

a first circuit for generating a first logical output for each digit of the respective addends from the sign portions of the respective addends;

a second circuit for generating a first intermediate logical value for each digit of the respective addends from the sign and magnitude portions of the respective addends;

a third circuit for generating a second intermediate logical value for each digit of the respective addends from the magnitude portions of the respective addends; and an output circuit receiving as inputs said first intermediate logical value, said second intermediate logical value and a pair of signal outputs from a preceding one of said cells and outputting at least a sum signal representing a sum of corresponding ones of said digits of said addends.

2. The processor according to claim 1 wherein said output circuit includes:

a first portion receiving said first and second intermediate logical values and said first logical output from a preceding one of said cells and outputting a third intermediate logical value; and a second portion receiving said second intermediate logical value and the third intermediate logical value and the first logical output from a preceding one of said cells and outputting said sum signal.

3. The processor according to claim 2 wherein said first portion includes circuitry for calculating the logical equation $U = E \bullet NOT(R_{-1}) + NOT(Q) \bullet NOT(E)$ for each paid of said corresponding digits of said addends, where U represents said third intermediate logical value and $R_{-1}$ represents said first logical output generated for said preceding cell.

4. The processor according to claim 2 wherein said second portion includes:

circuitry for calculating the logical equation $T = E \; XOR \; NOT(R_{-1})$ for each pair of said corresponding digits of said addends and producing T as output;

circuitry for calculating the logical equation $Z_s = U_{-1} \bullet T$ for each pair of said corresponding digits of said addends, where $Z_s$ represents a sign bit of said sum signal; and circuitry for calculating the logical equation $Z_m = NOT(T) \; XOR \; U_{-1}$ for each pair of said corresponding digits of said addends, where $Z_m$ represents a magnitude bit of said sum signal.

5. The processor according to claim 1 wherein said first circuit includes circuitry for calculating the logical equation $R = NOT(X_s + Y_s)$ for each pair of said corresponding digits of said addends, R representing said first logical output.

6. The processor according to claim 1 wherein said second circuit includes circuitry for calculating the logical equation $Q = (NOT(X_s) + NOT(Y_s)) \cdot X_m$, for each pair of said corresponding digits of said addends, Q representing said first intermediate logical value.

7. The processor according to claim 1 wherein said third circuit includes circuitry for calculating the logical equation $E = X_m XOR \; Y_m$ for each paid of said corresponding digits of said addends, E representing said second intermediate logical value.

8. A method for adding two signed digit addends, X and Y, each having a plurality of position digits, in a numerical processor, each position digit represented by respective logical sign portions $X_s$ and $Y_s$ and logical magnitude portions $X_m$ and $Y_m$, comprising the steps of:

generating a first logical output for each pair of corresponding position digits from their respective logical sign portions;

generating a first intermediate logical value for each said pair of corresponding position digits from their respective sign portions and magnitude portions;

generating a second intermediate logical value for each said pair of corresponding position digits from their respective magnitude portions;

generating a third intermediate logical value for each said pair of corresponding position digits from said first and second intermediate logical values and from the first logical output of a preceding pair of corresponding position digits; and generating an output sum of said pair of corresponding position digits from the second intermediate logical value for said pair and from the third intermediate logical value and the first logical output of said proceeding pair of corresponding position digits.

\* \* \* \* \*